US007956805B2

(12) United States Patent
Pon

(10) Patent No.: US 7,956,805 B2
(45) Date of Patent: Jun. 7, 2011

(54) SYSTEM AND/OR METHOD FOR OBTAINING A TIME REFERENCE FOR A RECEIVED SPS SIGNAL

(75) Inventor: Rayman Wai Pon, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 350 days.

(21) Appl. No.: 12/101,955

(22) Filed: Apr. 11, 2008

(65) Prior Publication Data

US 2009/0256745 A1 Oct. 15, 2009

(51) Int. Cl.
G01S 19/33 (2010.01)
G01S 19/30 (2010.01)

(52) U.S. Cl. .............. 342/357.73; 342/357.69
(58) Field of Classification Search ........... 342/357.12, 342/357.15, 357.73, 357.69
See application file for complete search history.

(56) References Cited

U.S. PATENT DOCUMENTS

| 5,663,734 | A  | * | 9/1997 | Krasner   | 342/357.12 |
| 6,075,987 | A  | * | 6/2000 | Camp et al. | 342/357.12 |
| 6,295,023 | B1 | * | 9/2001 | Bloebaum  | 342/357.06 |
| 7,710,318 | B2 |   | 5/2010 | Wang et al. | |
| 7,817,084 | B2 |   | 10/2010 | Pon et al. | |
| 2001/0033627 | A1 | * | 10/2001 | Syrjarinne | 375/354 |
| 2008/0048910 | A1 | * | 2/2008 | Wang et al. | 342/357.15 |
| 2008/0079633 | A1 | * | 4/2008 | Pon et al. | 342/357.12 |

FOREIGN PATENT DOCUMENTS

| EP | 1146349 A2 | 10/2001 |
| EP | 1160582 | 12/2001 |
| WO | WO 2004/063763 A1 * | 7/2004 |
| WO | WO2008024939 | 2/2008 |

OTHER PUBLICATIONS

G.W. Hein et al., Galileo Frequency & Signal Design. GPS World, vol. 14, No. 6, p. 30-37, Jun. 2003.*
C. Yang. Frequency-domain receiver for modernization GPS signals via full-band multi-code processing. Proceedings of the 18th International Technical Meeting of the Satellite Division of the Institute of Navigation, ION GNSS, Long Beach, CA, 2005.*
International Search Report for PCT/US2009/039750.*
International Preliminary Report of Patentability for PCT/US2009/039750.*

* cited by examiner

Primary Examiner — Fred H Mull
(74) Attorney, Agent, or Firm — Andrea L. Mays

(57) ABSTRACT

The subject matter disclosed herein relates to a system and method for obtaining time references for signals received from transmitters in a satellite and/or terrestrial navigation system.

42 Claims, 12 Drawing Sheets

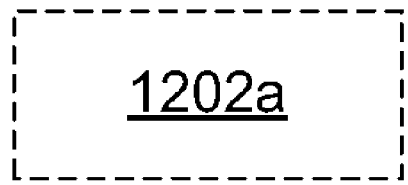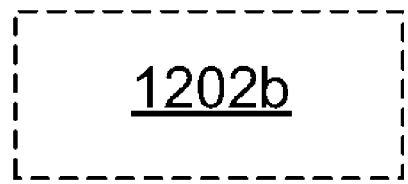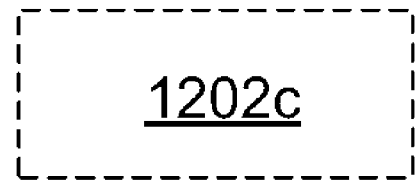
FIG. 10

SYSTEM AND/OR METHOD FOR OBTAINING A TIME REFERENCE FOR A RECEIVED SPS SIGNAL

BACKGROUND

1. Field

The subject matter disclosed herein relates to obtaining a time reference associated with navigation signals received at a reference location.

2. Information

A satellite positioning system (SPS) typically comprises a system of earth orbiting satellites enabling entities to determine their location on the earth based, at least in part, on signals received from the satellites. Such an SPS satellite typically transmits a signal marked with a repeating pseudorandom noise (PN) code of a set number of chips. For example, a satellite in a constellation of a Global Navigation Satellite System (GNSS) such as GPS or Galileo may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS satellite, a receiver may form multiple pseudorange hypotheses. Using additional information, a receiver may eliminate such pseudorange hypotheses to, in effect, reduce an ambiguity associated with a true pseudorange measurement. In addition to being encoded with a periodically repeating PN code sequence, a signal transmitted by a GNSS satellite may also be modulated by additional information such as, for example, a data signal and/or a known sequence of values. By detecting such additional information in a signal received from a GNSS satellite, a receiver may eliminate false pseudorange hypotheses associated with the received signal. In one example, such additional information may comprise a time reference associated with a signal received from a GNSS satellite. With sufficient accuracy in knowledge of timing of a signal received from a GNSS satellite, some or all false pseudorange hypotheses may be eliminated.

FIG. 1 illustrates an application of an SPS system, whereby a subscriber station 100 in a wireless communications system receives transmissions from satellites 102a, 102b, 102c, 102d in the line of sight to subscriber station 100, and derives time measurements from four or more of the transmissions. Subscriber station 100 may provide such measurements to position determination entity (PDE) 104, which determines the position of the station from the measurements. Alternatively, the subscriber station 100 may determine its own position from this information.

Subscriber station 100 may search for a transmission from a particular satellite by correlating the PN code for the satellite with a received signal. The received signal typically comprises a composite of transmissions from one or more satellites within a line of sight to a receiver at station 100 in the presence of noise. A correlation may be performed over a range of code phase hypotheses known as the code phase search window $W_{CP}$, and over a range of Doppler frequency hypotheses known as the Doppler search window $W_{DOPP}$. As pointed out above, such code phase hypotheses are typically represented as a range of PN code shifts. Also, Doppler frequency hypotheses are typically represented as Doppler frequency bins.

A correlation is typically performed over an integration time "I" which may be expressed as the product of $N_c$ and M, where $N_c$ is the coherent integration time, and M is the number of coherent integrations which are non-coherently combined. For a particular PN code, correlation values are typically associated with corresponding PN code shifts and Doppler bins to define a two-dimensional correlation function. Peaks of the correlation function are located and compared to a predetermined noise threshold. The threshold is typically selected so that the false alarm probability, the probability of falsely detecting a satellite transmission, is at or below a predetermined value. A time measurement for the satellite is typically derived from a location of an earliest non-side lobe peak along the code phase dimension which equals or exceeds the threshold. A Doppler measurement for the subscriber station may be derived from the location of the earliest non-side lobe peak along the Doppler frequency dimension which equals or exceeds the threshold.

Extracting timing information or a time reference associated with an acquired GNSS signal consumes power and processing resources. Such consumption of power and processing resources are typically critical design constraints in portable products such as mobile phones and other devices.

BRIEF DESCRIPTION OF THE FIGURES

Non-limiting and non-exhaustive features will be described with reference to the following figures, wherein like reference numerals refer to like parts throughout the various figures

FIG. 10 illustrates an overlap by a prescribed number of chips in a search window to avoid missing peaks that appear at segment boundaries according to one aspect.

SUMMARY

Figure 1:
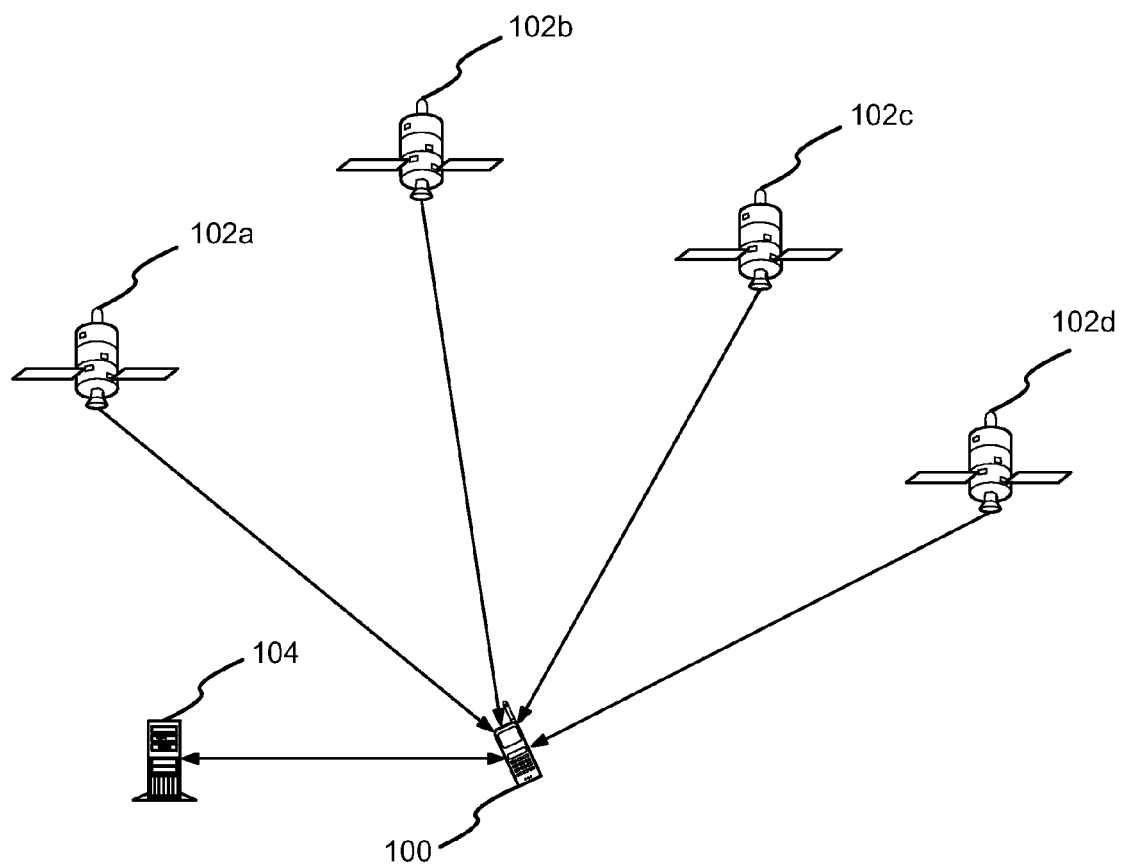
FIG. 1 is a schematic diagram of a satellite positioning system (SPS) according to one aspect.

In one aspect, a time reference associated with a first signal acquired at a reference location from a first transmitter is obtained based, at least in part, on a time reference associated with a second signal received at the reference location from a second transmitter. In another aspect, the time reference associated with the first signal is obtained based, at least in part, on an estimated difference between a first range to the first transmitter from the reference location and a second range to the second transmitter from the reference location.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular example, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA)

network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS', and that claimed subject matter is not limited in this respect.

Techniques described herein may be used with any one of several SPS, including the aforementioned SPS', for example. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with GPS time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

A "Global Navigation Satellite System" (GNSS) as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. An SV which is a member of a particular GNSS constellation typically transmits navigation signals in a format that is unique to the particular GNSS format. Accordingly, techniques for acquiring a navigation signal transmitted by an SV in a first GNSS may be altered for acquiring a navigation signal transmitted by an SV in a second GNSS. In a particular example, although claimed subject matter is not limited in this respect, it should be understood that GPS, Galileo and Glonass each represent a GNSS which is distinct from the other two named SPS'. However, these are merely examples of SPS' associated with distinct GNSS' and claimed subject matter is not limited in this respect.

According to one feature, a navigation receiver may obtain a pseudorange measurement to a particular SV based, at least in part, on an acquisition of a signal from the particular SV which is encoded with a periodically repeating PN code sequence. Acquisition of such a signal may comprise detecting a "code phase" which is referenced to time and an associated point in the PN code sequence. In one particular feature, for example, such a code phase may be referenced to a locally generated clock signal and a particular chip in the PN code sequence. However, this is merely an example of how a code phase may be represented and claimed subject matter is not limited in this respect.

According to an example, detection of a code phase may provide several ambiguous candidate psuedoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as a "true" pseudorange measurement to the SV. As pointed out above, a navigation receiver may estimate its location based, at least in part, on pseudorange measurements obtained from multiple SVs.

In one particular example, with an accurate knowledge of a time reference of an SPS signal received at a reference location region from a transmitter, and sufficient accuracy in knowledge of a range from the reference location region to the transmitter, a receiver may eliminate false pseudorange hypotheses to determine a true pseudorange measurement. Here, a "time reference" relates to an association between a known instance of an SPS signal transmitted from a transmitter and a portion of the transmitted SPS signal currently being received at a reference location region. In particular examples illustrated below, an SPS signal transmitted from a transmitter may be associated with a known instance such as start of day, week, hour, for example. In one aspect, such an instance in an SPS signal may be marked with information in a data signal modulating the SPS signal. Such information may comprise, for example, a particular known sequence of code symbols and/or numerical values. By extracting such sequence of code symbols and/or numerical values of a received SPS signal, a receiver may obtain a time reference associated with the received SPS signal.

Figure 2:
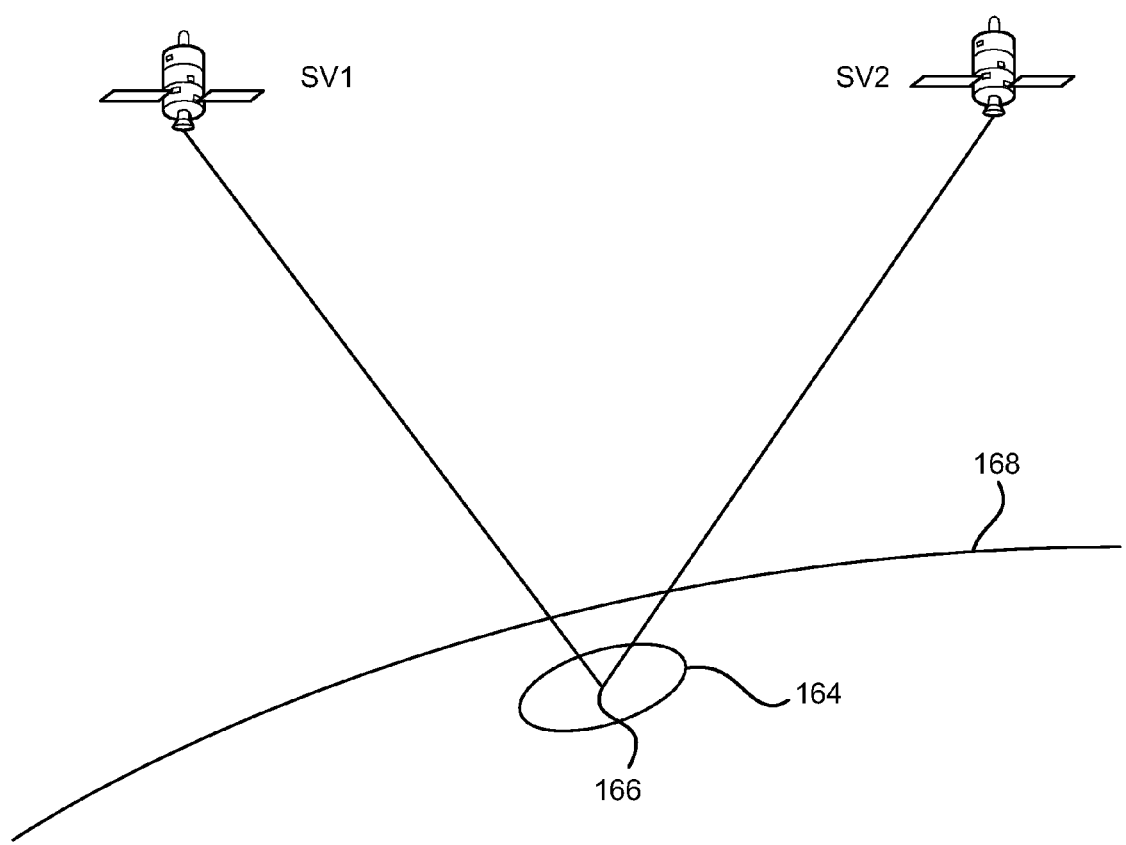
FIG. 2 shows a schematic diagram of a system that is capable of determining a location at a receiver by measuring pseudoranges to space vehicles (SVs) according to one aspect.

FIG. 2 shows a schematic diagram of a system that is capable of determining a location at a receiver by measuring pseudoranges to SVs according to an example. A receiver at a reference location center 166 on the Earth's surface 168 can view and receive signals from SV1 and SV2. Reference location center 166 may be known to be within reference location region 164 defined by, for example, a circle of a radius of about 10 km. It should be understood, however, that this is merely an example of how an uncertainty of an estimated location may be represented according to a particular aspect and claimed subject matter is not limited in this respect. In one example, region 164 may comprise a coverage area of a particular cell of a cellular wireless communication network at a known location.

According to an example, SV1 and SV2 may be members of different GNSS constellations. In particular examples illustrated below, SV1 may be a member of a GPS constellation while SV2 may be a member of a Galileo constellation. It should be understood, however, that this is merely an example of how a receiver may receive signals from SVs belonging to different GNSS constellations and claimed subject matter is not limited in this respect.

In one particular alternative, first and second SVs may be from a GPS constellation while at least one of the two SVs is capable of transmitting an L1C signal. Like a navigation signal from a Galileo SV, an L1C navigation signal may comprise a signal encoded with both a pilot channel and a data channel. The L1C periodically repeating PN code sequence may be 10 msec which may be different from Galileo's 4 msec. Accordingly, it should be understood that while particular examples discussed herein may relate to the use of SVs from Galileo and GPS constellations, such techniques may also apply to other examples employing two GPS SVs where at least one of the SVs is capable of transmitting an L1C signal. Again, these are merely examples of particular signals that may be received from an SPS at a receiver at a reference location region and claimed subject matter is not limited in this respect.

According to an example, a receiver at reference location region 164 may communicate with other devices such as, for example, a server (not shown) over a wireless communication link in, for example, a satellite communication network or terrestrial wireless communication network. In one particular example, such a server may transmit acquisition assistance (AA) messages to the receiver comprising information used by a receiver to process signals received from SVs and/or obtain pseudorange measurements. Alternatively, such AA messages may be provided from information locally stored in a memory of the receiver. Here, such locally stored information may be stored to the local memory from a removable memory device and/or derived from previous AA message received from a server, just to name a few examples. In a particular example, AA messages may comprise information such as, for example, information indicative of locations of SV1 and SV2, an estimate of the location of reference location center 166, an uncertainty associated with estimated reference location, an estimate of current time and/or the like. Such information indicative of positions of SV1 and SV2 may comprise ephemeris information and/or almanac information. As pointed out below according to particular examples, a receiver may estimate positions of SV1 and SV2 based, at least in part, on such ephemeris and/or almanac and a rough estimate of time. Such an estimated position of an SV may comprise, for example, an estimated azimuth angle from a reference direction and an elevation angle from the Earth's horizon at reference location center 166 and/or earth-centered XYZ coordinates.

Using information indicative of locations of SV1 and SV2, and an estimate of the location of reference location center 166, a receiver may estimate a first range from reference location center 166 to SV1 and estimate a second range from reference location center 166 to SV2. Here, it should be observed that if the first range is longer than the second range, an SPS signal transmitted from SV1 travels a longer duration to reach reference location center 166 than does an SPS signal transmitted from SV2. Likewise, if the second range is longer than the first range, an SPS signal transmitted from SV2 travels a longer duration to reach reference location center 166 than does an SPS signal transmitted from SV1.

In one particular example, an SPS signal transmitted from an SV is synchronized to known epochs and/or instances in time such as, for example, beginning of a particular hour, day, week, month, just to name of few examples. During such epochs and/or instances, an SV may modulate a transmitted SPS signal with information to mark such an epoch and/or instance. In an SV that is a member of a GPS constellation, for example, such information may be provided in a data signal such as a sequence of values and/or symbols transmitted on 20 msec symbol or bit intervals. In an SV that is a member of a Galileo constellation, for example, such information may be provided in a rate ½ Viterbi encoded data channel with 4 msec symbol durations. It should be understood, however, that these are merely examples of how information in an SPS signal may be used to mark a known epoch and/or instance, and claimed subject matter is not limited in this respect.

Upon receipt of an SPS signal with information marking a known epoch and/or instance, a receiver may obtain a time reference with respect to that particular SPS signal and/or transmitter transmitting the received SPS signal. In a particular example where such an SPS signal is transmitted from an SV in a GPS constellation, such a receiver may decode information in 20 msec symbol and/or bit intervals of a data signal marking the known epoch and/or instance. Where such an SPS signal is transmitted from an SV in a Galileo constellation, for example, such a receiver may decode information in a rate ½ Viterbi encoded data channel, for example.

In one particular aspect, a particular known instance and/or epoch associated with an SPS signal transmitted from a first transmitter may be synchronized with a particular known instance and/or epoch of an SPS signal transmitted from a second transmitter. For example, a particular instance in a GPS signal transmitted from SV1, such as a transition between symbol and/or bit intervals in a data signal modulating the GPS signal, may be synchronized with a particular instance in a Galileo signal transmitted from SV2, such as a transition between 4.0 msec code phase intervals and/or rate ½ Viterbi encoded symbol intervals of 4.0 msecs in a data channel.

Figure 3:
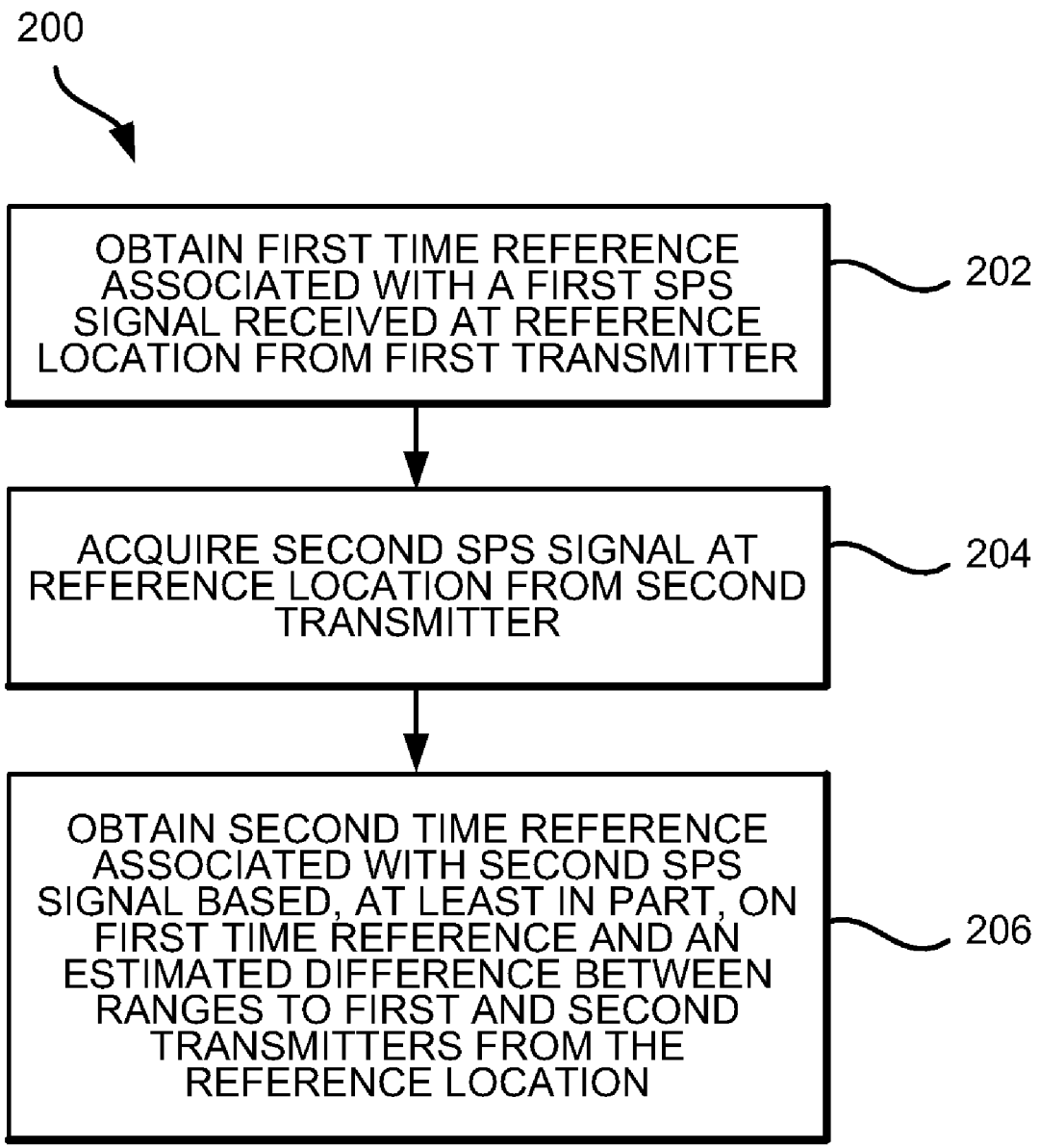
FIG. 3 is a flow diagram illustrating a process for obtaining a time reference for a signal acquired from an SV at a reference location according to one aspect.

As illustrated in the flow diagram of FIG. 3 according to a particular feature, a time reference obtained from a first SPS signal received from a first transmitter may be used to obtain a time reference of a second SPS signal received at the reference location region from a second transmitter. At block 202, a receiver at a reference location region may obtain a first time reference associated with a first SPS signal received from a first transmitter, such as a transmitter located on an SV for example. Here, for example, such a receiver may decode and/or demodulate information from the first SPS signal associated with or identifying a particular known instance and/or epoch in time.

Alternatively, a receiver may employ data correlation methods to accurately infer a time reference from a received SPS signal. If signal power is sufficiently low, for example, a receiver may not be able to accurately demodulate individual data bits from a data signal modulating a received SPS signal. Here, a receiver may correlate known patterns within a received SPS signal. With a sufficient number of successful correlations with a received SPS signal, a receiver may also determine and/or extract a time reference associated with a transmitter transmitting the received SPS signal. In one embodiment, a receiver may correlate known patterns with a signal received from the same transmitter or different transmitters. It should be understood, however, that these are merely examples of how a receiver may obtain a time reference associated with a received SPS signal according to particular embodiments and that claimed subject matter is not limited in this respect.

At block 204 of FIG. 3, the receiver at the reference location may acquire a second SPS signal from a second transmitter. Such acquisition of the second SPS signal may comprise, for example, detection of PN code phase boundaries separating repeating code phase intervals. Here, a receiver at a reference location region may receive the second SPS signal encoded with a periodically repeating PN code. To acquire the second SPS signal, such a receiver may detect a Doppler frequency and code phase in the received signal. Such a detection of a code phase may comprise, for example, a correlation of code and/or time-shifted versions of a locally generated code sequence. In one example where the second SPS signal is transmitted from a Galileo SV, for example, such a code phase may be detected within a 4.0 ms repeating period of a PN code sequence. Alternatively, where the second SPS signal is transmitted from a GPS SV, such a code phase may be detected within a 1.0 ms repeating period of a PN code sequence. However, this is merely an example of how an SPS signal may be acquired, and claimed subject matter is not limited in this respect.

While FIG. 3 shows the actions at block 202 occurring prior to the actions at block 204, it should be understood that the order of such actions may be reversed in alternative implementations. In yet other implementations, actions performed at blocks 202 and 204 may occur in parallel.

Finally, at block 206, the receiver may obtain a time reference associated with the second SPS signal based, at least in part, on the time reference associated with the first time reference (obtained from the first SPS signal) and an estimate of a difference between a range from the reference location to the first transmitter and a range from the reference location to the second transmitter. Here, by using such an estimated difference between the first and second ranges, a receiver may account for differences between travel time of the first SPS signal from the first transmitter to the reference location and travel time of the second SPS signal from the second transmitter to the reference location. While there may exist some uncertainty in connection with accuracy of a time reference associated with the first SPS signal obtained at a receiver, errors associated with such a time reference may comprise a constant time error associated with multiple transmitters transmitting SPS signals which are received at the reference location. Accordingly, such a constant error may removed when determining a final navigation solution, for example.

In one particular example, an actual difference L (in units of time, for example) may define a difference between a range to a first transmitter from the reference location and a range to a second transmitter from the reference location. For the purpose of illustrating a particular example implementation, an estimate of difference E[L] is determined for transmitters located at SV1 and SV2 as shown in FIG. 2. It should be understood, however, that transmitters transmitting SPS signals need not be located on SVs and that the approach discussed below may be applied for estimating difference L for transmitters located on different platforms such as pseudolites, for example. Here, an actual difference L between a range to a first transmitter at SV1 from reference location center 166 and a range to a second transmitter at SV2 from reference location center 166 may be expressed as follows:

$$L = T_2 - T_1$$

where:
$T_1$=propagation delay of signal from SV1 as measured at reference location at a given time; and
$T_2$=propagation delay of signal from SV2 as measured at reference location at same given time.

To obtain a time reference associated with the second received SPS, for example, a receiver may determine an estimate of a difference L (in units of time, for example) between a range to the first transmitter from the reference location center and a range to the second transmitter from the reference location center according to relation (1) as follows:

$$E[L] = E[T_2 - T_1] \quad (1)$$

As errors associated with measurements of $T_2$ and $T_1$ may be presumed to be substantially independent, the expression $E[T_2-T_1]$ may be approximated by the expression $E[T_2]-E[T_1]$. Here, in a particular example, a value for the expression $E[T_2]-E[T_1]$ may be known and/or available to a receiver through an AA message for a particular time. Alternatively, a receiver may derive such a value for the expression $E[T_2]-E[T_1]$ for a particular time from information received in such an AA message.

An estimate of difference L, E[L], according to relation (1) may be reduced to an expression that cancels receiver clock error τ as follows:

$$E[L] = E[T_2] - E[T_1]$$
$$= (R_{SV2}/c - \tau) - (R_{SV1}/c - \tau)$$
$$= (R_{SV2} - R_{SV1})/c$$

where:
c=speed of light;
τ=receiver clock bias error;
$R_{SV1}$=estimate of range to SV1 from reference location center; and
$R_{SV2}$=estimate of range to SV2 from reference location center.

Here, it should be observed that a value for difference estimate E[L] may be expressed in units of either linear length or time, and that conversion between units of such an expression for the value of E[L] may be provided by the speed of light expressed in the appropriate units. According, it should be understood that such a value for difference estimate E[L] may expressed interchangeably in either units of time or linear length without deviating from claimed subject matter.

According to a particular example, block 206 may compute an estimate difference between a range from reference location center 166 to SV1 ("$R_{SV1}$") and a range from reference location center 166 to SV2 ("$R_{SV2}$"). Here, block 206 may obtain AA information from one or more AA messages indicating, for example, estimates of locations of SV1 and SV2 in earth-centered XYZ coordinates in addition to an estimate of earth-centered XYZ coordinates for reference location center 166. Using such earth-centered XYZ coordinates, block 206 may compute Euclidean distances for $R_{SV1}$ and $R_{SV2}$.

As illustrated below with particular examples, a receiver at a reference location may determine a time reference on a first SPS signal transmitted from a first transmitter acquired at a reference location and acquire a second SPS signal transmitted from a second transmitter. In a particular feature, such a receiver may further determine a time reference on the second acquired SPS signal based, at least in part, on the time reference associated with the first acquired SPS signal if a single sided uncertainty associated with a difference estimate E[L] is less than ½ a repeating period of information in the second acquired SPS signal.

Figure 4:
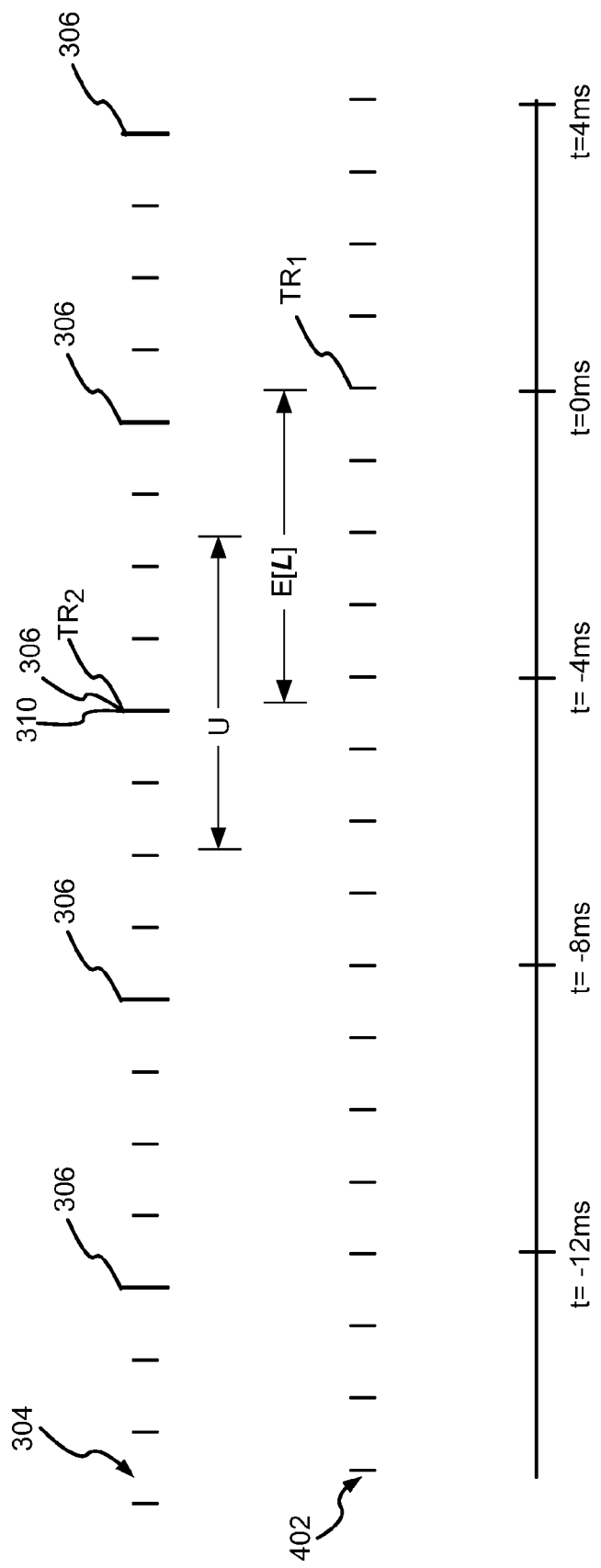
FIG. 4 is a timing diagram illustrating an association of a time reference in a first signal received at a reference location and a time reference in a second signal received at the reference location according to one aspect.

FIGS. 4 though 8 illustrate particular examples of how a time reference of a first SPS signal received from a first transmitter at a reference location may be used to obtain a second time reference of a second SPS signal transmitted from a second transmitter and acquired at the reference location. Here, time references of the first and second SPS signals may be associated by difference estimate E[L]. In the particular illustrated examples, a time reference $TR_1$ is obtained for a first SPS signal transmitted by a first SV and is arbitrarily marked at time t=0. Time reference $TR_1$ is also synchronized with a particular instance in the acquired second SPS signal transmitted by second SV. For the purpose of illustrating particular examples, a range from the reference location to the first SV is longer than a range from the reference location to the second SV. Accordingly, time reference $TR_1$ received at t=0 is associated and/or synchronized with an instance and/or epoch of the acquired second SPS signal in the past by an amount L. It should be understood that in other embodiments, however, a range from the reference location to the first SV may be shorter than or equal to a range from the reference location to the second SV such that a time reference in the received first SPS signal is associated and/or synchronized with an instance and/or epoch of the acquired second SPS signal in the future by an amount L.

In the particular example of FIG. 4, a first SPS signal 302, transmitted by a first SV in a GPS constellation, is received and acquired at a reference location while a second SPS signal 304 transmitted by a second SV in a Galileo constellation is acquired at the reference location. A time reference $TR_1$ associated with SPS signal 302 is obtained at a time marked arbitrarily as t=0. SPS signal 304 comprises 4.0 msec PN code intervals separated by boundaries 306, which are known since the signal is acquired. In one feature, time reference $TR_1$ may be synchronized with a particular boundary 306 separating 4.0 msec PN code intervals. Since $TR_1$ is synchronized with a boundary 306 in SPS signal 304, with a two-sided uncertainty region U in an estimate E[L] of less than 4.0 msec, a receiver may determine time reference $TR_2$ of SPS signal 304 to be at a particular boundary 310 separating 4.0 msec PN code intervals in SPS signal 304.

It should be pointed out that, in an alternative implementation, first SPS signal 302 in the above particular example of FIG. 4 may be transmitted by a first SV in a Galileo or other GNSS constellation, without deviating from claimed subject matter. In another alternative implementation, second SV signal 304 may be transmitted by a second SV in another GNSS constellation, whose signal structure is similar to the Galileo signal structure, such as an L1C signal in a GPS constellation, for example. Again, these are merely alternative implementations and claimed subject matter is not limited in these respects.

Figure 5:
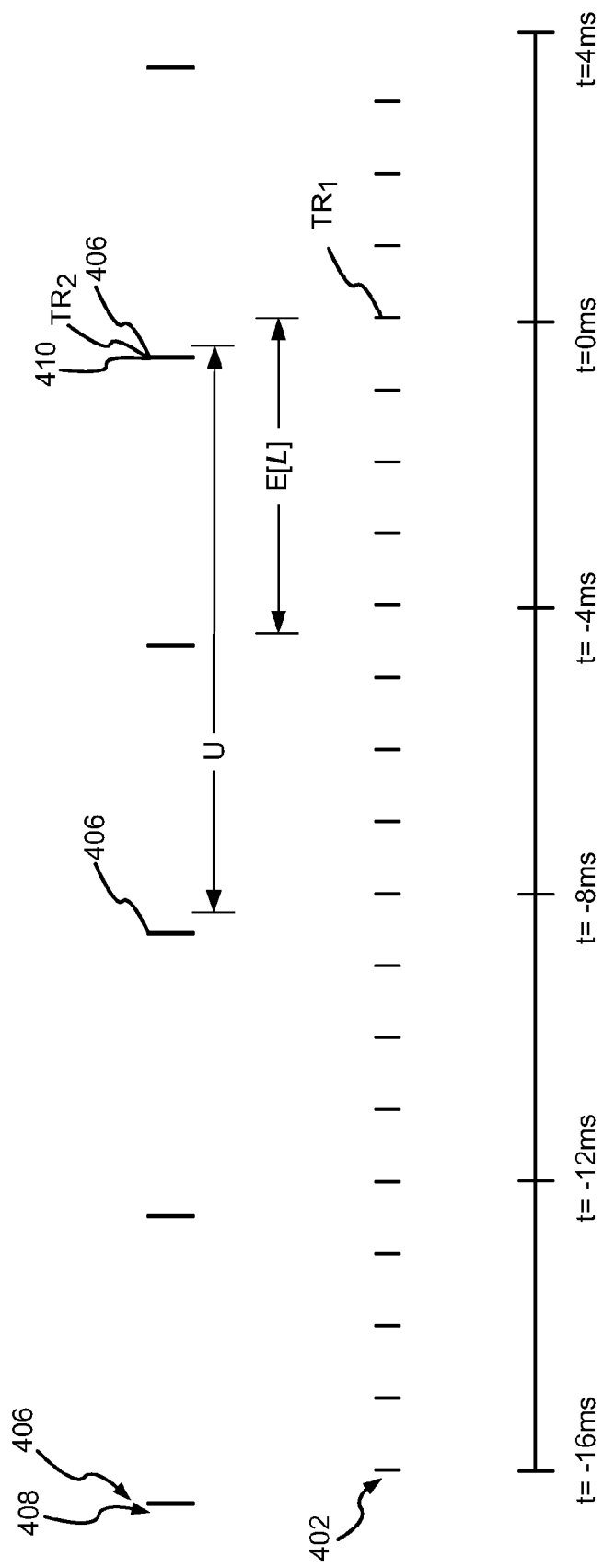
FIG. 5 is a timing diagram illustrating an association of a time reference in a first signal received at a reference location and a time reference in a second signal received at the reference location according to one aspect.

In the particular example of FIG. 5, a first SPS signal 402, transmitted by a first SV in a GPS constellation, is received and acquired at a reference location while a second SPS signal 408 transmitted by a second SV in a Galileo constellation is acquired at the reference location. In this particular example, in addition to acquiring SPS signal 402, a receiver may have sufficiently decoded a data channel modulating SPS signal 408 to determine boundaries 406 between 8.0 msec rate ½ Viterbi encoded data and/or values. Again, time reference $TR_1$ associated with SPS signal 402 is obtained at a time marked arbitrarily as t=0. However, time reference $TR_1$ is synchronized with a particular boundary 406 separating 8.0 msec rate ½ Viterbi encoded values or data in the decoded data channel. Accordingly, as illustrated in FIG. 5, with a two-sided uncertainty region U in an estimate E[L] of less than 8.0 msec, a receiver may determine time reference $TR_2$ of SPS signal 408 to be at a particular boundary 410 separating 8.0 msec rate ½ Viterbi encoded data and/or values in a data channel modulating SPS signal 408.

It should be pointed out that, in an alternative implementation, first SPS signal 402 in the above particular example of FIG. 5 may be transmitted by a first SV in a Galileo or other GNSS constellation, without deviating from claimed subject matter. In another alternative implementation, second SV signal 408 may be transmitted by a second SV in another GNSS constellation, whose signal structure is similar to the Galileo signal structure, such as an L1C signal in a GPS constellation, for example. Again, these are merely alternative implementations and claimed subject matter is not limited in these respects.

Figure 6:
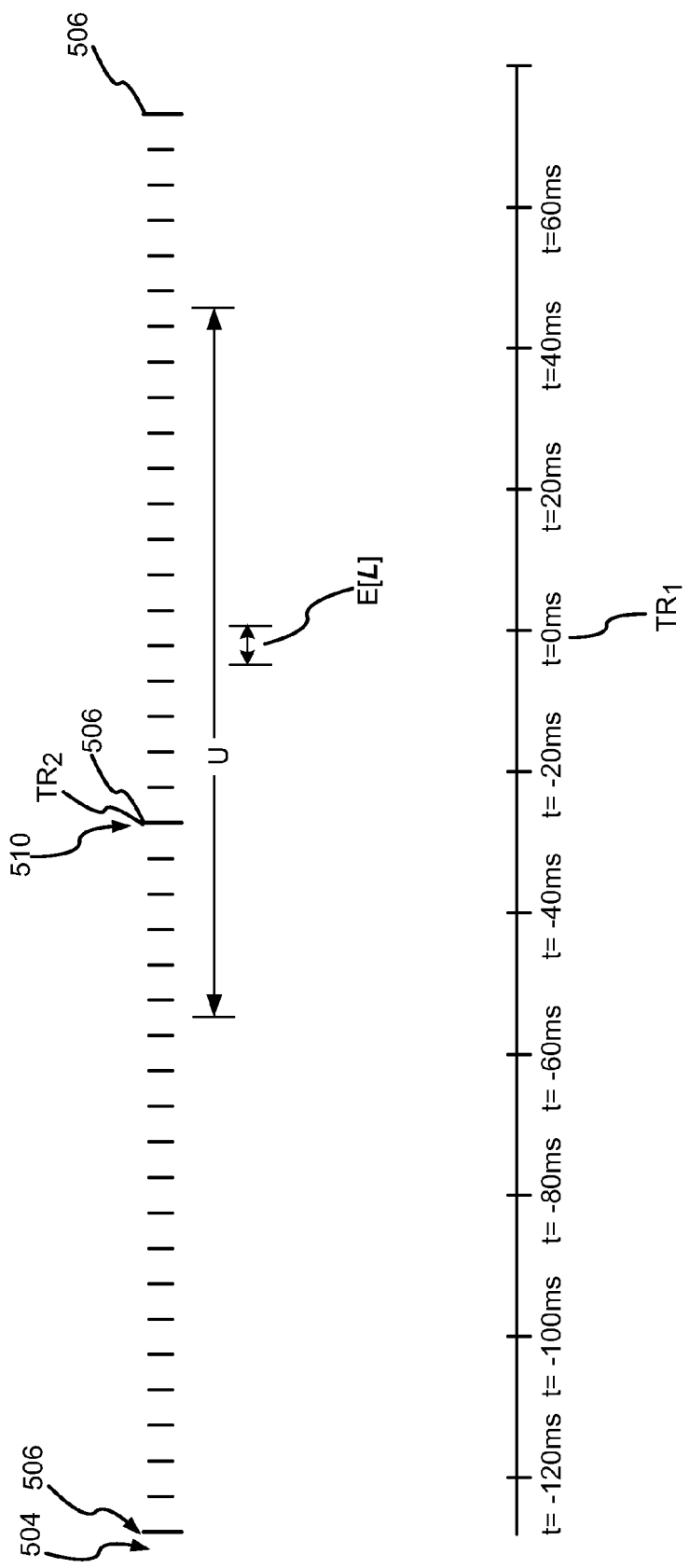
FIG. 6 is a timing diagram illustrating an association of a time reference in a first signal received at a reference location and a time reference in a second signal received at the reference location according to one aspect.

In the particular example of FIG. 6, a first SPS signal (not shown), transmitted by a first SV in a GPS constellation, is received and acquired at a reference location while a second SPS signal 504 transmitted by a second SV in a Galileo constellation is acquired at the reference location. In this particular example, in addition to acquiring SPS signal 504, a receiver may have decoded a pilot channel comprising a 100 msec code sequence modulating SPS signal 504 to determine boundaries 506 between 100 msec code sequence intervals. Again, time reference $TR_1$ associated with the first SPS signal is obtained at a time marked arbitrarily as t=0. However, time reference $TR_1$ is synchronized with a particular boundary 506 separating 100 msec code sequences of the decoded pilot channel. Accordingly, as illustrated in FIG. 6, with a two-sided uncertainty region U in an estimate E[L] of less than 100 msec, a receiver may determine time reference $TR_2$ of SPS signal 504 to be at a particular boundary 510 separating 100 msec periodic epochs.

It should be pointed out that, in alternative implementation, a first SPS signal (not shown) in the above particular example of FIG. 6 may be transmitted by a first SV in a Galileo or other GNSS constellation, without deviating from claimed subject matter. In another alternative implementation, second SV signal 504 may be transmitted by a second SV in another GNSS constellation, whose signal structure is similar to the Galileo signal structure, such as an L1C signal in a GPS constellation. Again, these are merely alternative implementations and claimed subject matter is not limited in these respects.

Figure 7:
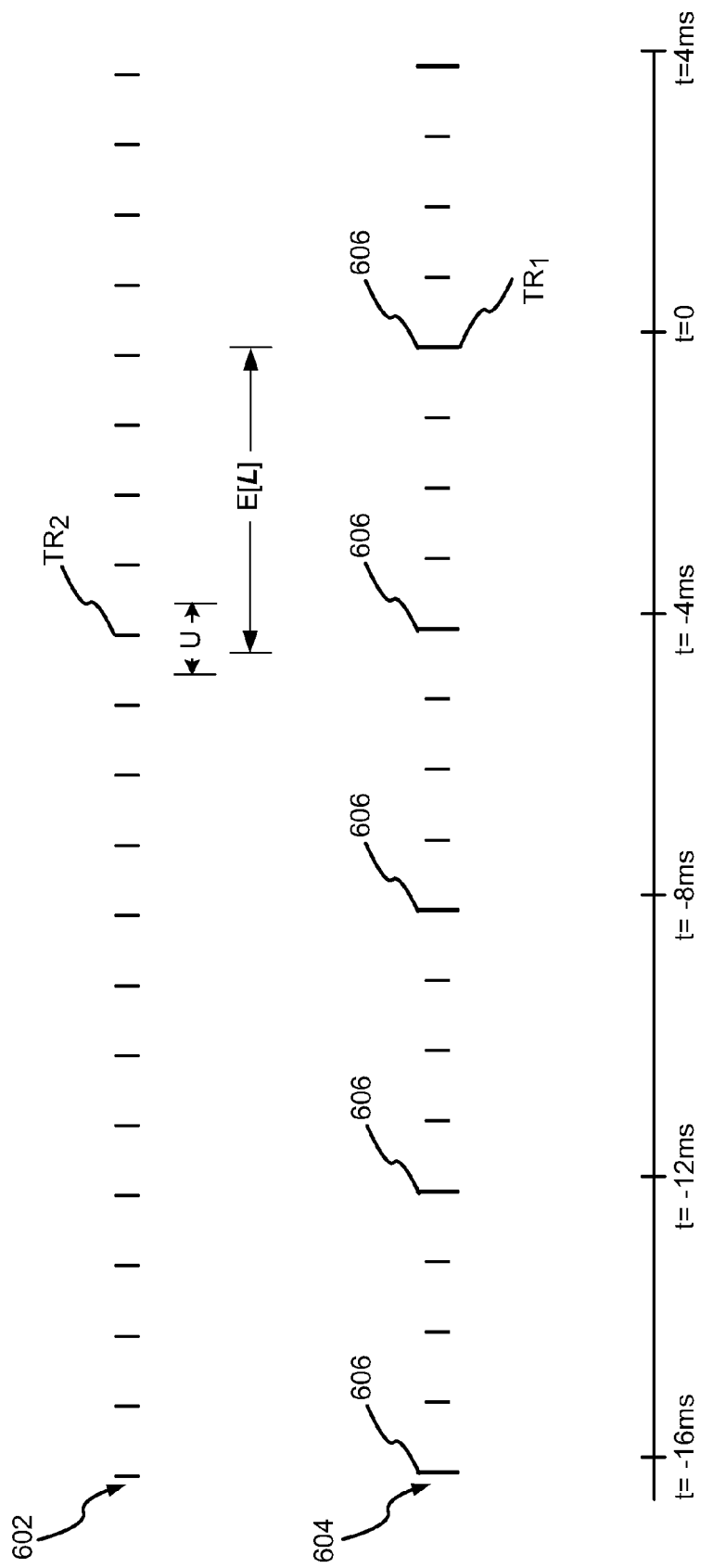
FIG. 7 is a timing diagram illustrating an association of a time reference in a first signal received at a reference location and a time reference in a second signal received at the reference location according to one aspect.

In the particular example of FIG. 7, a first SPS signal 604, transmitted by a first SV in a Galileo constellation, is received and acquired at a reference location while a second SPS signal 602 transmitted by a second SV in a GPS constellation is acquired at the reference location. Time reference $TR_1$ associated with SPS signal 604 is obtained at a time marked arbitrarily as t=0. Additionally, time reference $TR_1$ is synchronized with a particular boundary between 1.0 msec PN code intervals of acquired signal 602. Accordingly, as illustrated in FIG. 7, with a two-sided uncertainty region U in an estimate E[L] of less than 1.0 msec, a receiver may determine time reference $TR_2$ of SPS signal 602 to be at a particular boundary separating 1.0 msec. PN code intervals of SPS signal 602.

It should be pointed out that, in an alternative implementation, first SPS signal 604 in the above particular example of FIG. 7 may be transmitted by a first SV in a GPS or other GNSS constellation without deviating from claimed subject matter.

Figure 8:
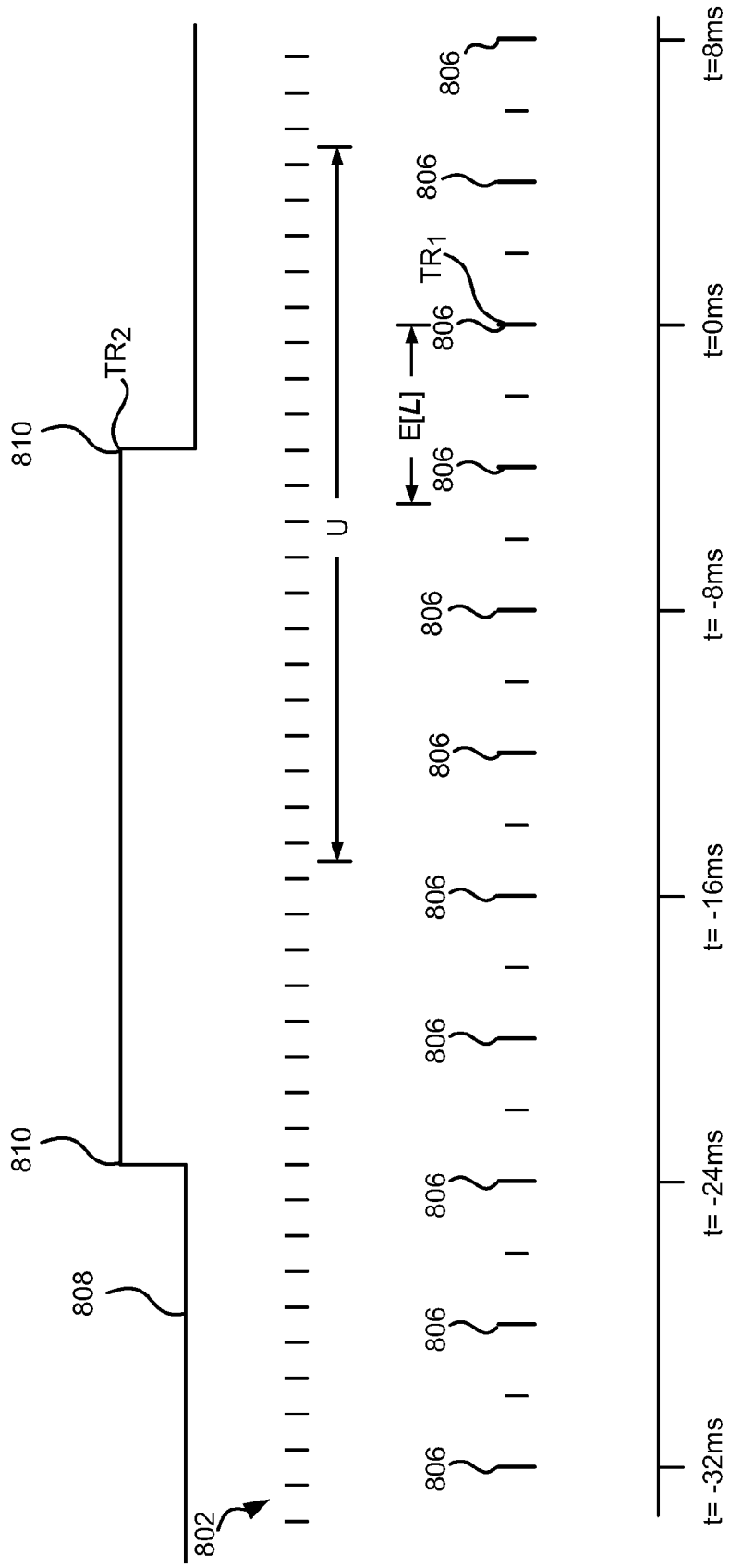
FIG. 8 is a timing diagram illustrating an association of a time reference in a first signal received at a reference location and a time reference in a second signal received at the reference location according to one aspect.

In the particular example of FIG. 8, a first SPS signal 804, transmitted by a first SV in a Galileo constellation, is received and acquired at a reference location while a second SPS signal 802 transmitted by a second SV in a GPS constellation is acquired at the reference location. Time reference $TR_1$ associated with SPS signal 804 is obtained at a time marked arbitrarily as t=0. Additionally, time reference $TR_1$ is synchronized with a particular "bit edge" separating 20.0 msec bit or symbol intervals in a data signal 808 modulating SPS signal 802. By acquiring signal SPS signal 802 and determining or identifying the bit edge boundary separating 20 msec bit or symbol intervals in SPS signal 802, shown by bit edge locations 810, a receiver may determine time reference $TR_2$ of SPS signal 802 to be at a particular bit edge in bit edges 810 if a two-sided uncertainty region U in E[L] is less than 20.0 msec.

It should be pointed out that, in an alternative implementation, the first SPS signal 804 in the above particular example of FIG. 8 may be transmitted by a first SV in a GPS or other GNSS constellation, without deviating from claimed subject matter.

According to an example, although claimed subject matter is not limited in this respect, accuracy of difference estimate E[L] is based, at least in part, on an amount or degree of uncertainty associated with an estimate of the reference location region. In the particular example of FIG. 2, again for the purpose of illustrating a particular feature, a single-sided uncertainty ρ in difference estimate E[L] with respect to SV1 and SV2 may be determined according to relation (2) as follows:

$$\rho = 1/c * Punc * [\{\cos(E2)*\cos(A2) - \cos(E1)*\cos(A1)\}^2 + \{\cos(E2)*\sin(A2) - \cos(E1)*\sin(A1)\}^2]^{1/2} \quad (2)$$

where:
c=speed of light
A1=estimated azimuth angle to SV1 from the reference location center;
A2=estimated azimuth angle to SV2 from the reference location center;
E1=estimated elevation angle to SV1 from the reference location center;
E2=estimated elevation angle to SV2 from the reference location center; and
Punc=single-sided uncertainty in reference location region in units of length.

Here, it should be observed that two-sided uncertainty region U as illustrated in FIGS. 4 through 8 above may be derived from single sided uncertainty ρ as U=E[L]+/−ρ.

According to an example, an SV visible at a receiver (e.g., as indicated in an AA message) may be associated with a particular set of search window parameters defining a two-dimensional domain of code phase and Doppler frequency hypotheses to be searched for the SV. In one implementation, illustrated in FIG. 9, search window parameters for an SV comprise a code phase search window size, $WIN\_SIZE_{CP}$, a code phase window center, $WIN\_CENT_{CP}$, a Doppler search window size, $WIN\_SIZE_{DOPP}$, and a Doppler window center, $WIN\_CENT_{DOPP}$. In the case where the entity whose position is sought to be determined is a subscriber station in an IS-801 compliant wireless communication system, these parameters may be indicated by an AA message provided to the subscriber station by a PDE.

Figure 9:
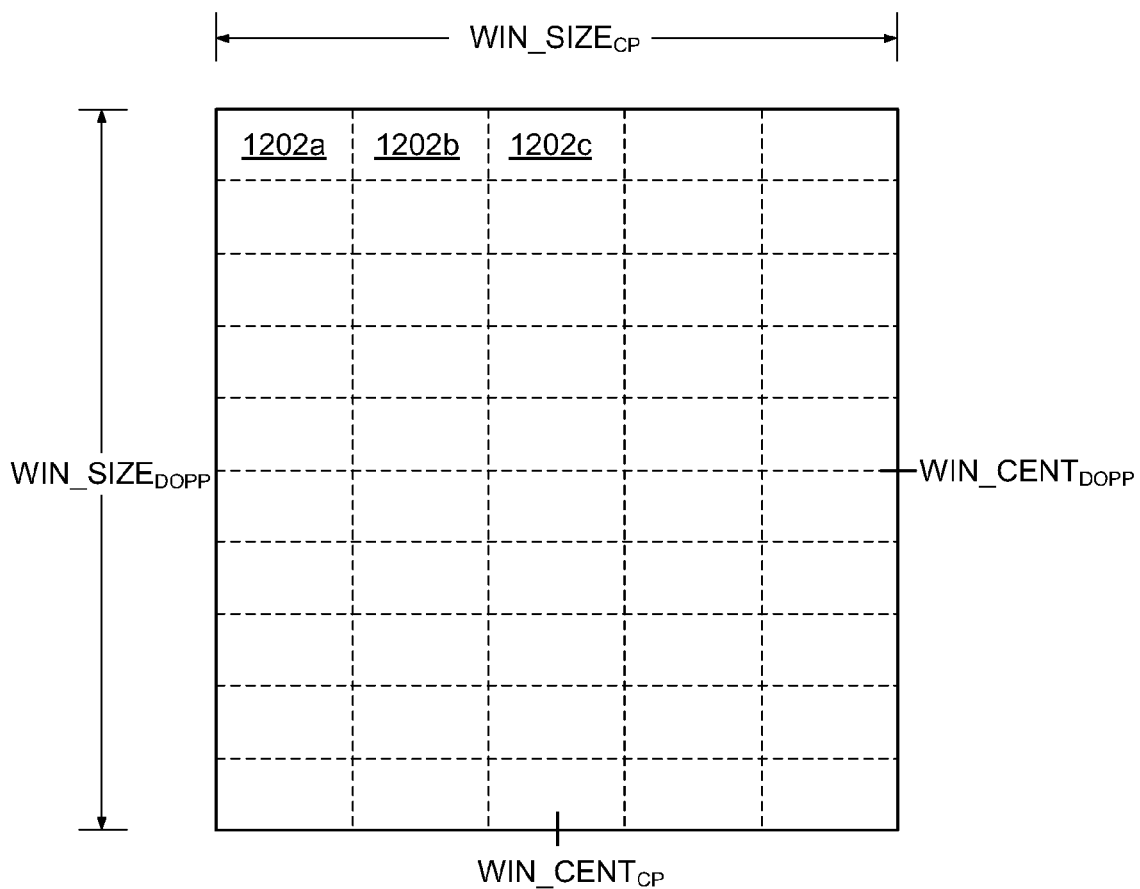
FIG. 9 is a schematic diagram of a two-dimensional domain to be searched for detection of a signal transmitted from a space vehicle according to one aspect.

The two-dimensional search space for an SV illustrated in FIG. 9 shows a code phase axis is a horizontal axis, and a Doppler frequency axis as a vertical axis, but this assignment is arbitrary and could be reversed. The center of the code phase search window is referred to as $WIN\_CENT_{CP}$, and the size of the code phase search window is referred to as $WIN\_SIZE_{CP}$. The center of the Doppler frequency search window is referred to as $WIN\_CENT_{DOPP}$, and the size of the Doppler frequency search window is referred to as $WIN\_SIZE_{DOPP}$.

Following acquisition of a first signal from a first SV, according to an example, $WIN\_CENT_{CP}$, and $WIN\_SIZE_{CP}$ for acquisition of a second signal from a second SV may be determined based, at least in part, on a code phase detected in the first acquired signal, an estimate of receiver location and information descriptive of locations for the first and second SVs for a particular time t. As illustrated in FIG. 10, a search space for acquiring the second signal may be partitioned into a plurality of segments 1202a, 1202b, 1202c, each of which is characterized by a range of Doppler frequencies and a range of code phases.

According to an example, a range of code phases characterizing a segment may be equal to the capacity of a channel of a correlator to search of the segment through a single channel pass. In one particular example where the channel capacity is thirty-two chips, for example, a range of code phases characterizing a segment may be likewise thirty-two chips, but it should be appreciated that other examples are possible.

Segments may be caused to overlap by a prescribed number of chips to avoid missing peaks that appear at segment boundaries as illustrated in FIG. 10. Here, a tail end of segment 1202a overlaps the front end of segment 1202b by Δ chips, and the tail end of segment 1202b likewise overlaps the front end of segment 1202c by Δ chips. Because of the overhead due to this overlap, an effective range of code phases represented by a segment may be less than the channel capacity. In the case where the overlap is four chips, for example, an effective range of code phases represented by a segment may be twenty-eight chips.

Figure 11:
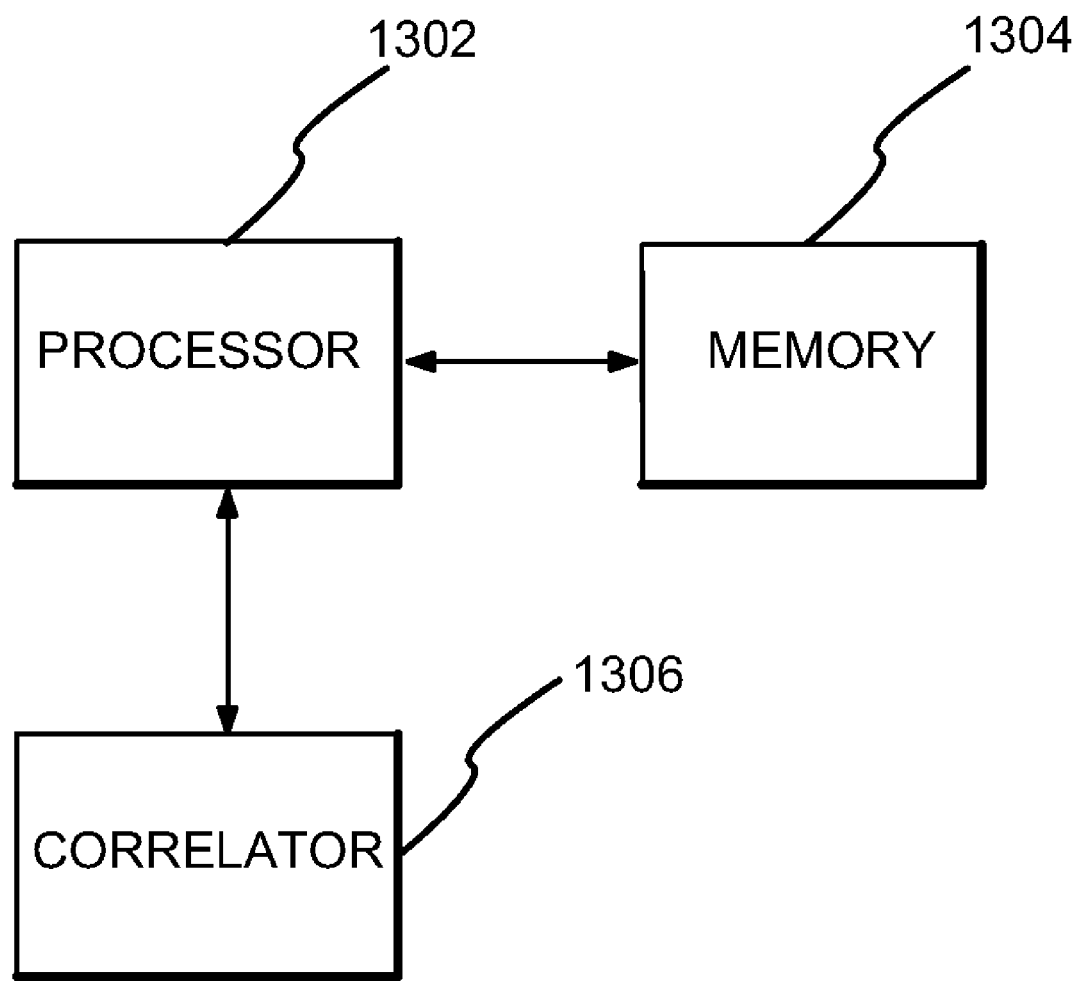
FIG. 11 is a schematic diagram of a system for processing signals to determine a position location according to one aspect.

A system for acquiring periodically repeating signals from SVs is illustrated in FIG. 11 according to a particular example. However, this is merely an example of a system that is capable of acquiring such signals according to a particular example and other systems may be used without deviating from claimed subject matter. As illustrated in FIG. 11 according to a particular example, such a system may comprise a computing platform including a processor 1302, memory 1304, and correlator 1306. Correlator 1306 may be adapted to produce correlation functions from signals provided by a receiver (not shown) to be processed by processor 1302, either directly or through memory 1304. Correlator 1306 may be implemented in hardware, software, or a combination of hardware and software. However, these are merely examples of how a correlator may be implemented according to particular aspects and claimed subject matter is not limited in these respects.

According to an example, memory 1304 may store machine-readable instructions which are accessible and executable by processor 1302 to provide at least a portion of a computing platform. Here, processor 1302 in combination with such machine-readable instructions may be adapted to perform all or portions of process 200 illustrated above with reference to FIG. 3. In a particular example, although claimed subject matter is not limited in these respects, processor 1302 may direct correlator 1306 to search for position determination signals as illustrated above and derive measurements from correlation functions generated by correlator 1306.

Figure 12:
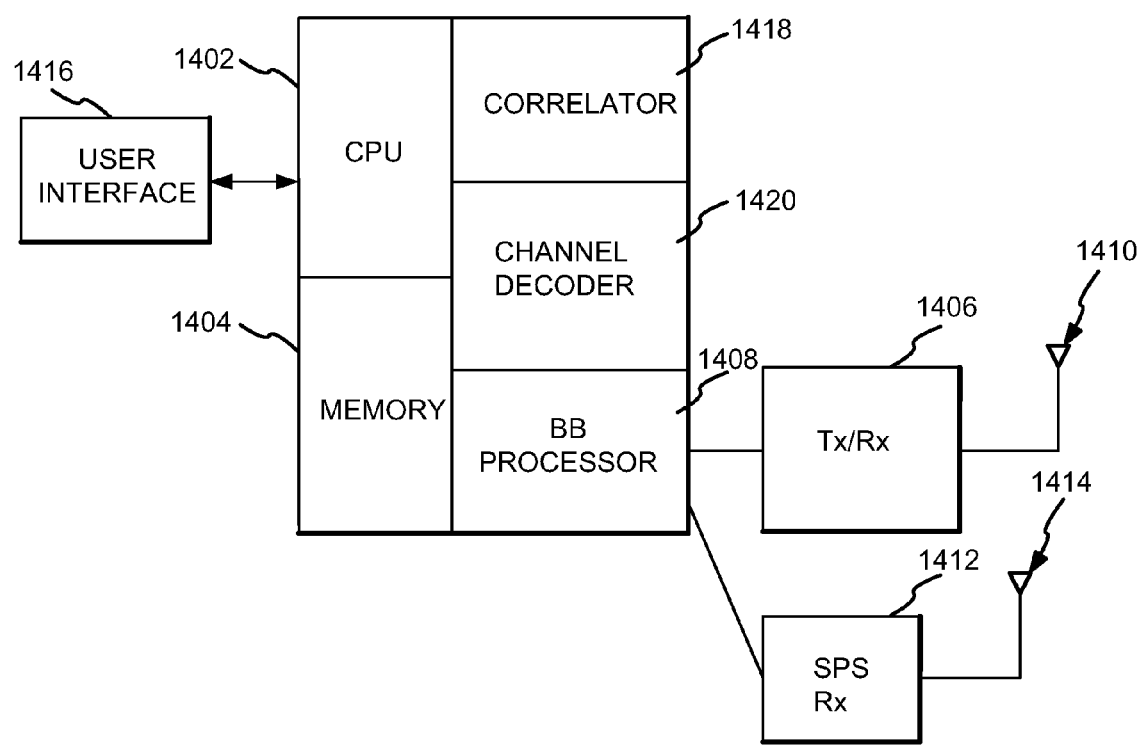
FIG. 12 is a schematic diagram of a subscriber station according to one aspect.

Turning to FIG. 12, radio transceiver 1406 may be adapted to modulate an RF carrier signal with baseband information, such as voice or data, onto an RF carrier, and demodulate a modulated RF carrier to obtain such baseband information. An antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1406 for transmission over a wireless communications link. Here, CPU 1402 may obtain such baseband information from an input device within user interface 1416. Baseband processor 1408 may also be adapted to provide baseband information from transceiver 1406 to CPU 1402 for transmission through an output device within user interface 1416.

User interface 1416 may comprise a plurality of devices for inputting or outputting user information such as voice or data. Such devices may include, for example, a keyboard, a display screen, a microphone, and a speaker.

SPS receiver (SPS Rx) 1412 may be adapted to receive and demodulate transmissions from SVs, and provide demodulated information to correlator 1418. Correlator 1418 may be adapted to derive correlation functions from the information provided by receiver 1412. For a given PN code, for example, correlator 1418 may produce a correlation function defined over a range of code phases to set out a code phase search window, and over a range of Doppler frequency hypotheses as illustrated above. As such, an individual correlation may be performed in accordance with defined coherent and non-coherent integration parameters.

Correlator 1418 may also be adapted to derived pilot-related correlation functions from information relating to pilot signals provided by transceiver 1406. This information may be used by a subscriber station to acquire wireless communications services.

Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, examples, implementations, or examples thereof which have been described or suggested. CPU 1402 may be adapted to access and execute such machine-readable instructions. Through execution of these machine-readable instructions, CPU 1402 may direct correlator 1418 to perform dwells employing particular search modes at blocks 204 and 220, analyze the GPS correlation functions provided by correlator 1418, derive measurements from the peaks thereof, and determine whether an estimate of a location is sufficiently accurate. However, these are merely examples of tasks that may be performed by a CPU in a particular aspect and claimed subject matter in not limited in these respects.

In a particular example, CPU 1402 at a subscriber station may estimate a location the subscriber station based, at least in part, on signals received from SVs as illustrated above. CPU 1402 may also be adapted to determine a code search range for acquiring a second received signal based, at least in part, on a code phase detected in a first received signals as illustrated above according to particular examples. It should be understood, however, that these are merely examples of systems for estimating a location based, at least in part, on pseudorange measurements, determining quantitative assessments of such pseudorange measurements and terminating a process to improve accuracy of pseudorange measurements according to particular aspects, and that claimed subject matter is not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   obtaining a first time reference associated with a first SPS signal received at a reference location from a first transmitter; and
   obtaining a second time reference associated with a second SPS signal acquired at said reference location from a second transmitter based, at least in part, on said first time reference and on an estimated difference between a first range to said first transmitter from said reference location and a second range to said second transmitter from said reference location, in response to a determination that an uncertainty associated with said estimated difference is less than a threshold associated with an information duration of said second SPS signal.

2. The method of claim 1, wherein said first and second transmitters are located at respective first and second space vehicles (SVs) which are members of different GNSS constellations.

3. The method of claim 1, wherein said first transmitter is located on a first space vehicle (SV) which is a member of a GPS constellation and said second transmitter is located at a second SV which is a member of a Galileo constellation.

4. The method of claim 3, wherein said obtaining said second time reference associated with said second SPS signal further comprises:
   detecting a rate ½ Viterbi boundary in a data signal modulating said second SPS signal; and
   determining said second time reference based, at least in pan, on said detected rate ½ Viterbi boundary.

5. The method of claim 3, wherein said obtaining said second time reference associated with said second SPS signal further comprises:
   detecting boundaries in a periodic code sequence modulating said second SPS signal; and
   determining said second time reference based, at least in part, on said detected boundaries.

6. The method of claim 1, wherein said first transmitter is located at a satellite vehicle (SV) which is a member of a Galileo constellation and said second transmitter is located at a second SV which is a member of a GPS constellation.

7. The method of claim 6, wherein said obtaining said second time reference associated with said second SPS signal further comprises:
   detecting bit edge boundaries in a data signal modulating said second SPS signal; and
   determining said second time reference based, at least in part, on said detected bit edge boundaries.

8. The method of claim 1, wherein said first transmitter is located on a first space vehicle (SV) which is a member of a GPS constellation, and said SPS signal comprises an L1C signal.

9. The method of claim 1, wherein said second transmitter is located at a satellite vehicle (SV) which is a member of a GPS signal and said first SPS signal comprises an L1C signal.

10. The method of claim 1, and further comprising:
determining whether said uncertainty associated with said estimated difference is less than said threshold associated with said information duration of said second SPS signal.

11. The method of claim 10, wherein said uncertainty is determined based, at least in part, on a single-signed uncertainty associated with said reference location.

12. The method of claim 10, wherein said uncertainty is determined based, at least in part, on at least one of: an estimated azimuth angle to said first transmitter from said reference location, an estimated azimuth angle to said second transmitter from said reference location; an estimated elevation angle to said first transmitter from said reference location, and/or and estimated elevation angle to said second transmitter from said reference location.

13. The method of claim 10, wherein said uncertainty represents a single-sided uncertainty, and said determining comprises:
determining whether said single-sided uncertainty is less than one-half of said threshold value.

14. The method of claim 10, wherein said uncertainty represents a two-sided uncertainty.

15. The method of claim 10, wherein said information duration is based, one least in part, on a repeating period of information in said second SPS signal.

16. An article comprising:
a storage medium, said storage medium comprising machine-readable instructions stored thereon which are executable by a computing platform to:
obtain a first time reference associated with a first SPS signal received at a reference location from a first transmitter, and
obtain a second time reference associated with a second SPS signal acquired at said reference location from a second transmitter based, at least in part, on said first time reference and on an estimated difference between a first range to said first transmitter from said reference location and a second range to said second transmitter from said reference location, in response to a determination that an uncertainty associated with said estimated difference is less than a threshold associated with an information duration of said second SPS signal.

17. The article of claim 16, wherein said first and second transmitters are located at respective first and second space vehicles (SVs) which are members of different GNSS constellations.

18. The article of claim 16, wherein said first transmitter is located on a first space vehicle (SV) which is a member of a GPS constellation and said second transmitter is located at a second SV which is a member of a Galileo constellation.

19. The article of claim 18, wherein said instructions are further executable by said computing platform to:
detect a rate ½ Viterbi boundary in a data signal modulating said second SPS signal; and
determine said second time reference based, at least in part, on said detected rate ½ Viterbi boundary.

20. The article of claim 18, wherein said instructions are further executable by said computing platform to:
detect boundaries in a periodic code sequence modulating said second SPS signal; and
determine said second time reference based, at least in part, on said detected boundaries.

21. The article of claim 16, wherein said first transmitter is located at a satellite vehicle (SV) which is a member of a Galileo constellation and said second transmitter is located at a second SV which is a member of a GPS constellation.

22. The article of claim 21, wherein said instructions are further executable by said computing platform to:
detect bit edge boundaries in a data signal modulating said second SPS signal; and
determine said second time reference based, at least in part, on said detected bit edge boundaries.

23. The article of claim 16, wherein said first transmitter is located on a first space vehicle (SV) which is a member of a GPS constellation, and said SPS signal comprises an L1C signal.

24. The article of claim 16, wherein said second transmitter is located at a satellite vehicle (SV) which is a member of a GPS signal and said first SPS signal comprises an L1C signal.

25. The article of claim 16, wherein said information duration is based, one least in part, on a repeating period of information in said second SPS signal.

26. A subscriber unit comprising:
a receiver to receive an acquisition assistance (AA) message comprising information indicative of locations of first and second space vehicles (SVs) and
a processor to:
obtain a first time reference associated with a first SPS signal received at a reference location from a first transmitter; and
obtain a second time reference associated with a second SPS signal acquired at said reference location from a second transmitter based, at least in part, on said first time reference and on an estimated difference between a first range to said first transmitter from said reference location and a second range to said second transmitter from said reference location, in response to a determination that an uncertainty associated with said estimated difference is less than a threshold associated with an information duration of said second SPS signal.

27. The subscriber unit of claim 26, wherein said receiver to receive said AA message over a terrestrial wireless communication link.

28. The subscriber unit of claim 26, wherein said first and second transmitters are located at respective first and second space vehicles (SVs) which are members of different GNSS constellations.

29. The subscriber unit of claim 26, wherein said first transmitter is located on a first space vehicle (SV) which is a member of a GPS constellation and said second transmitter is located at a second SV which is a member of a Galileo constellation.

30. The subscriber unit of claim 29, wherein said processor, to:
detect a rate ½ Viterbi boundary in a data signal modulating said second SPS signal; and
determine said second time reference based, at least in part, on said detected rate ½ Viterbi boundary.

31. The subscriber unit of claim 30, wherein said processor to:
detect boundaries in a periodic code sequence modulating said second SPS signal; and
determine said second time reference based, at least in part, on said detected boundaries.

32. The subscriber unit of claim 26, wherein said first transmitter is located at a satellite vehicle (SV) which is a member of a Galileo constellation and said second transmitter is located at a second SV which is a member of a GPS constellation.

33. The subscriber unit of claim 32, wherein said processor to:
  detect bit edge boundaries in a data signal modulating said second SPS signal; and
  determine said second time reference based, at least in part, on said detected bit edge boundaries.

34. The subscriber unit of claim 26, wherein said first transmitter is located on a first space vehicle (SV) which is a member of a GPS constellation, and said SPS signal comprises an L1C signal.

35. The subscriber unit of claim 26, wherein said second transmitter is located at a satellite vehicle (SV) which is a member of a GPS signal and said first SPS signal comprises an L1C signal.

36. The subscriber unit of claim 26, wherein said information duration is based, one least in part, on a repeating period of information in said second SPS signal.

37. A system comprising:
  a position determination entity (PDE); and
  a subscriber unit to:
    receive an acquisition assistance (AA) message from said PDE over a terrestrial wireless communication link, said AA message comprising information indicative of locations of first and second transmitters;
    estimate a difference between a first range from a reference location to said first transmitter and a second range from said reference location to said second transmitter based, at least in part, on said information;
    obtain a first time reference associated with a first SPS signal received at a reference location from said first transmitter; and
    obtain a second time reference associated with a second SPS signal acquired at said reference location from said second transmitter based, at least in part, on said first time reference and on an estimated difference between a first range to said first transmitter from said reference location and a second range to said second transmitter from said reference location, in response to a determination that an uncertainty associated with said estimated difference is less than a threshold associated with an information duration of said second SPS signal.

38. The system of claim 37, wherein said information duration is based, one least in part, on a repeating period of information in said second SPS signal.

39. An apparatus comprising:
  means for obtaining a first time reference associated with a first SPS signal received at a reference location from a first transmitter; and
  means for obtaining a second time reference associated with a second SPS signal acquired at said reference location from a second transmitter based, at least in part, on said first time reference and on an estimated difference between a first range to said first transmitter from said reference location and a second range to said second transmitter from said reference location, in response to a determination that an uncertainty associated with said estimated difference is less than a threshold associated with an information duration of said second SPS signal.

40. The apparatus of claim 39, wherein said first and second transmitters are located at respective first and second space vehicles (SVs) which are members of different GNSS constellations.

41. The apparatus of claim 39, and further comprising:
  means for determining whether said uncertainty associated with said estimated difference is less than said threshold associated with said information duration of said second SPS signal.

42. The apparatus of claim 39, wherein said information duration is based, one least in part, on a repeating period of information in said second SPS signal.

* * * * *